United States Patent [19]

Gehrke

[11] 4,407,874
[45] Oct. 4, 1983

[54] STERILIZABLE FLEXIBLE PACKAGING STRUCTURE

[75] Inventor: Russell P. Gehrke, Neenah, Wis.

[73] Assignee: American Can Company, Greenwich, Conn.

[21] Appl. No.: 405,753

[22] Filed: Aug. 6, 1982

[51] Int. Cl.³ .................. B65D 85/72; B65D 65/40; B65D 81/18; B32B 27/08
[52] U.S. Cl. ........................ 428/35; 206/484; 206/484.2; 206/524.2; 426/113; 426/127; 428/215; 428/216; 428/516
[58] Field of Search ............. 428/35, 215, 216, 516, 428/523; 206/484, 484.2, 548.2; 426/113, 127

[56] References Cited

U.S. PATENT DOCUMENTS

| | | | |
|---|---|---|---|
| 4,275,119 | 6/1981 | Weiner | 428/35 |
| 4,276,330 | 6/1981 | Stanley et al. | 428/35 |
| 4,303,710 | 12/1981 | Bullard et al. | 428/35 |
| 4,308,084 | 12/1981 | Ohtusuki et al. | 428/35 |
| 4,355,721 | 10/1982 | Knott et al. | 428/35 |
| 4,356,221 | 10/1982 | Anthony et al. | 428/35 |
| 4,357,376 | 11/1982 | Nattinger et al. | 428/35 |
| 4,360,551 | 11/1982 | Guarino et al. | 428/35 |
| 4,364,981 | 12/1982 | Horner et al. | 428/35 |

Primary Examiner—William J. Van Balen
Attorney, Agent, or Firm—Stuart S. Bowie; Thomas D. Wilhelm

[57] ABSTRACT

The invention provides improved film structure and bags made therefrom for use in sterile packaging, wherein the package and product are sterilized after the process of filling and sealing the bag. The improved structure is a 3-layer coextruded film comprising a first layer of propylene ethylene copolymer, a second layer on one surface of the first layer and comprising a blend of propylene ethylene copolymer with linear low density polyethylene, and a third layer of linear low density polyethylene on the opposing surface of the second layer. The blend composition is 20% to 80% propylene ethylene copolymer and 80% to 20% linear low density polyethylene.

8 Claims, 3 Drawing Figures

STERILIZABLE FLEXIBLE PACKAGING STRUCTURE

BACKGROUND OF THE INVENTION

Heat sealed sheet or film pouches are used for packaging certain products which are stored under sterile conditions. Typical of products stored under these conditions are certain foods and fluids used in medical care. In the packaging of food, the general class of packages is known as retort pouches. In the medical care business, representative products are fluids which are introduced into the patient by intravenous injection, the packages being commonly called I.V. bags, which nomenclature is adopted hereinafter.

Common to the requirements of I.V. bags is the requirement that the filled and sealed package be subjected to sterilizing conditions of relatively high temperature after the bag is filled with product and sealed. Typical sterilizing conditions range in severity up to about 250° F. with residence times at that temperature of as much as 30 minutes or more. Such conditions impose severe stresses on the packages. Many otherwise acceptable polymeric materials are incapable of adequately protecting and holding the products under these processing conditions. Typically, problems are encountered with excessive weakening or failure of the heat seals about the periphery of the pouch. If a multiple layer sheet material is used in forming the bag, separations may develop between the layers during processing. Certain single layer polymeric structures, such as polyvinyl chloride, can survive the processing, but have other deficiencies.

Another requirement of an I.V. bag is that it retain its clarity after the autoclave processing. Manufacturers, packagers, and users of I.V. solutions require the ability to visually inspect the packaged product at all times. This allows any visually detectable changes in the product to be noted, as a further measure of the quality control and safety concerns of this highly safety-sensitive industry.

In dispensing of I.V. solution, it is desirable to be able to objectively estimate the rate of dispensing by observing, from time to time, the amount of solution gone from the bag. To this end, the bag is usually marked with volume, or scale marking along one side. Thus the bag must be dimensionally stable through the processing so that accurate volume readings may be taken.

After the packaging and sterilizing processes are complete, the packages must be capable of withstanding normal abuse of shipping, handling and use. Thus the requirements imposed on the package are relatively severe in that it must withstand severe processing conditions and, subsequently, be strong enough to accept physical handling abuse.

I.V. bags are commonly made of polyvinyl chloride-based (PVC) films. PVC bags, however, require the use of plasticizers to achieve needed flexibility in the film. There is a concern that the plasticizers may migrate into the product and cause undesirable effects on the user of the product. PVC films also allow passage of an undesirably high amount of moisture out through the film. This potential moisture loss could cause gradual compositional and volume change of the solution and could be a significant factor in determining product shelf life. To this end, conventional PVC bags are overwrapped with a moisture barrier material such as high density polyethylene.

Thus, it is desirable to provide an improved packaging structure for use with sterile products, wherein the package is sterilized after filling and sealing. The improved structure should be capable of withstanding sterilizing process conditions, including protecting and holding the product during the processing, and should emerge with strong heat seals about its periphery and with good integrity of the film structure. Particularly important is good adhesion between the layers, if a multiple layer film is used. For use with human contacting products, the package must, of course, be made of materials which have no, or very low, toxicity to humans. To the extent that a barrier to transmission of moisture can be provided at reasonable cost, this too, is desirable, and would allow elimination of the costly overwrapping. Finally, the bag must have good heat seals in order to contain the product and to minimize package failures due to rough handling.

SUMMARY OF THE INVENTION

It has now been found that certain of the foregoing and related objects are attained in a coextruded multiple layer film. The film has a first layer of a propylene ethylene copolymer. A second layer is adhered on one of its surfaces to the first layer, the second layer being a blend of 20% to 80% propylene ethylene copolymer and 80% to 20% linear low density polyethylene.

By definition, the term propylene ethylene copolymer should herein be interpreted, and is intended to include copolymers of propylene and ethylene, blends of polypropylene and polyethylene, and combinations of the copolymers and blends.

A third layer is adhered to the other surface of the second layer. The third layer comprises linear low density polyethylene.

The layers of films of this invention are capable of remaining firmly bonded to each other even after exposure to autoclave processing conditions.

In a preferred embodiment of this film, it is desirable that the film be at least 5 mils thick, with the film structure being such that the third layer, of propylene ethylene copolymer comprises about 10% to 50% of the thickness of the film, the second layer comprises about 10% of the thickness of the film and the first layer, of linear low density polyethylene, comprises about 40% to 80% of the thickness of the film.

In the second layer, a preferred composition is about 50% propylene ethylene copolymer and 50% linear low density polyethylene.

Additional objects of the invention are attained in a heat sealed bag made with films accorded the film structures herein described. In the bag, facing sidewalls are joined to each other by heat seals about the periphery of the bag. The bag is capable of maintaining strong heat seals and strong interlayer adhesions after being subjected to retort processing conditions, each sidewall of the bag comprising a first layer disposed toward the interior of the bag and including the heat seals. The first layer comprises the linear low density polyethylene layer. The second layer, adhered on one of its surfaces to the first layer, is disposed outwardly of the bag from the first layer, and is the blend layer comprising 20% to 80% propylene ethylene copolymer and 80% to 20% linear low density polyethylene. The third layer which is adhered to the other surface of the second layer is propylene ethylene copolymer.

DETAILED DESCRIPTION OF THE INVENTION

Figure 1:
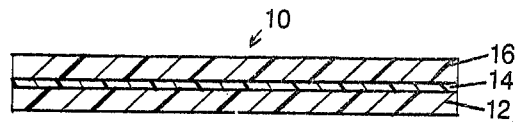
FIG. 1 is a cross-section of a three-layer polymeric sheet structure of the invention.
Figure 2:
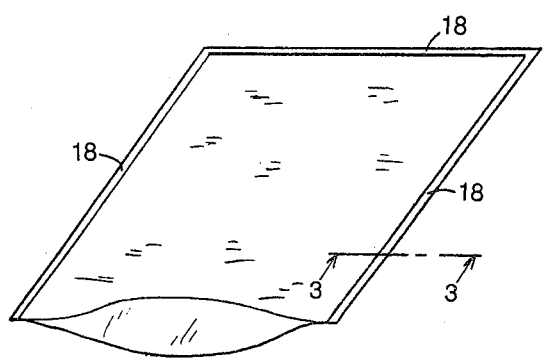
FIG. 2 is representative of a typical bag made from sheet structure of the invention.

The invention is most simply and clearly illustrated in relation to a three layer polymeric sheet structure, as shown in FIG. 1, and a bag-type package from that sheet structure, as shown in FIG. 2.

In the sheet structure of FIG. 1, generally designated as 10, layer 12 is on one surface and is composed of linear low density polyethylene. Layer 14 is an adhesive, or tie, layer firmly adhered on one of its surfaces to one surface of layer 12. The composition of layer 14 is a blend of 20% to 80% linear low density polyethylene and 80% to 20% propylene ethylene copolymer. Layer 16 is firmly adhered on one of its surfaces to the other surface of layer 14. The material composition of layer 16 is a propylene ethylene copolymer. The composite film is the three layer structure shown in FIG. 1.

Figure 3:
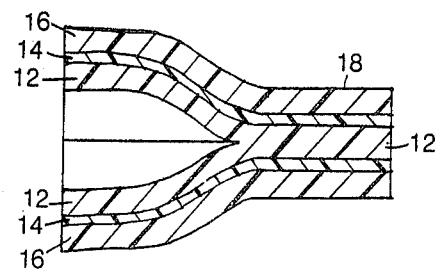
FIG. 3 is a cross-section of a portion of the bag of FIG. 2 and is taken as shown at 3—3 of FIG. 2.

FIG. 2 shows a bag or pouch made from the sheet structure of FIG. 1. The cross-section of the bag is shown in FIG. 3. Layer 16 forms the exterior surface of the bag. Layer 12 forms the interior surface of the bag and is heat sealed on its facing surfaces, as at 18, about the periphery of the bag. The bag structure thus has an inner heat seal layer of linear low density polyethylene, an outer layer of propylene ethylene copolymer, and a tie layer of a blend of propylene ethylene copolymer and linear low density polyethylene.

The formed bag is intended for packaging products which will be subjected to a sterilizing process after the product is in the package and the package is sealed. A common sterilizing process is autoclave, or retort, processing. In this process, closed and sealed packages are placed in a pressure vessel. Steam is then introduced into the vessel at about 250° F. at a sufficiently high pressure to permit maintainence of the desired temperature. The temperature and pressure are usually maintained for about 30 minutes. Finally, the pressure vessel is cooled and the processed packages are removed.

In order for the package to perform its protective and containing functions, it must survive intact these severe processing conditions. Specifically, there are two areas of known potential weakness.

First the heat seals formed by facing surfaces of the heat seal layer have been troublesome in bags made with conventional sheet structures. When the heat seal fails at any point on the sealed periphery of the bag the package is, of course destroyed.

Second, the interlayer adhesion, namely that between the layers of the multiple layer sheet material, has been subject to failure by delamination in conventional structures. While such delamination may not yield an immediate failure of the bag, the bag structure is nevertheless weakened and is subject to failure due to subsequent abuses, such as normal handling, and including dropping, in shipment.

Bags made according to this invention are fully capable of withstanding the processing conditions and of subsequently passing the normal abuse testing required of such packages.

Layer 12, the heat seal layer, may be any of the polymers or copolymers known as linear low density polyethylene.

Layer 16 is a copolymer of propylene and ethylene and contains between about 2% and 5% ethylene units and between about 95% and 98% propylene units.

Layer 14 is a blend of 80% to 20% propylene ethylene copolymer and 20% to 80% linear low density polyethylene. While the polymeric components of layer 14 need not be identical to those of the corresponding polymeric materials in layers 12 and 16, there should be strong similarities between the chemical and physical properties of these corresponding components in order to assure development of good bonding with layer 14. The greater the similarities in properties between corresponding component materials, the lower the amount of that material required in the blend to assure good interlayer bonding. Thus the chemical and physical properties of the linear low density polyethylene used in layer 12 should be similar to the chemical and physical properties of the linear low density polyethylene used as a component in layer 14. Since only a limited selection of linear low density polyethylenes is currently available, and since there are not great differences between resins, the selection of linear low density polyethylene resins for compatibility between layers 12 and 14 is relatively easy.

Similarly, the chemical and physical properties of the propylene ethylene copolymer used as a component in layer 14 should be similar to the chemical and physical properties of the propylene ethylene copolymer used in layer 16.

A primary element of concern is the percentage of ethylene in the copolymer. The function of the ethylene is to somewhat soften the layer 16 composition. With polypropylene homopolymer, layer 16 is susceptible to developing stress lines when subjected to abuse testing or abusive handling. The inclusion of ethylene in the composition makes the film more resilient so that susceptibility to stress weakening is reduced. A lower limit of about 2% ethylene is required to provide minimal improvements in the film structure. A composition of 3.5% ethylene has been found highly desirable. As the amount of ethylene is increased the susceptibility to stress weakening is reduced. However, the ethylene content may not be indiscriminately increased as other, and undesirable, parameters emerge. Polymeric ethylene is not as dimensionally stable as polymeric propylene, so the dimensional stability gradually decreases with increased ethylene content. Likewise, polymeric ethylene does not tolerate retort conditions as well as polypropylene, so some propylene is required for processability. Also, as the ethylene content is raised, so is the tendency for the bags to stick together in the retort vessel, the sticking phenomenon being known as blocking. Finally, the good moisture barrier of the bags of this invention is due primarily to the propylene component. As the ethylene content rises, and conversely, the propylene content falls, the moisture barrier capability of the film declines.

Thus the selection of the amount of ethylene is dependent on the functional requirements of the specific package being considered. The specific content for each structure will depend on its end use.

Another primary element of concern is that the copolymer compositions of layer 16 and the copolymer component of layer 14 be selected such that there is good compatibility physically and chemically between the two compositions; this to encourage intimate contact and bond development between the respective components of the layers.

A preferred process for formation of sheet structure 10 is coextrusion of the 3-layer structure through a conventional slot die onto a metal chill roll. Another preferred method is by coextrusion of the 3-layer structure in a blown, tubular water quenched process.

The method of forming bags from the sheet structure is not critical so long as normal heat sealing principles are followed. Nevertheless, an illustration of acceptable bag forming processes may be helpful.

After the sheet structure is formed, the sheet may be cut into sheet elements of predetermined size and shape for the formation of bags. In making the bags, either a sheet is folded over onto itself and sealed about the bag periphery to form a bag, or two sheets are superimposed one on the other with facing heat seal layers, and are sealed about a common periphery. In either case, a bag similar to that in FIG. 2 is formed. Bags may, of course, also be formed by forming heat seals in a continuous sheet and subsequently cutting the pre-formed bags from the continuous sheet. Or the bags may be filled with product before being cut from the sheet. After the bag is formed by heat seals, by whatever process, product is inserted and the bag closed. The bag is then ready for sterilization processing in the pressure vessel as hereinbefore iterated.

EXAMPLE

A three layer polymeric film was cast coextruded onto a chill roll held at 70° F. The film composition, by thickness, from one surface to the other, was 30% propylene ethylene copolymer, 10% blend, and 60% linear low density polyethylene. The linear low density polyethylene was DOW 2045 in both the sealant and blend layers. The propylene ethylene copolymer was ARCO-W-431 in both the copolymer and blend layers. ARCO-W-431 is 3.5% ethylene. The composition of the blend layer was equal quantities, by weight, of the propylene ethylene copolymer and the linear low density polyethylene.

Segments of the three layer film were folded over onto themselves and heat sealed about their periphery to form bags. The bags were then filled with I.V. solution and sealed. The sealed bags were then dropped in free fall from a height of six feet onto a flat concrete surface without any of the bags breaking. The bags were then sterilized by autoclave processing in a pressure vessel at 250° F. for 30 minutes. After the bags were cooled and removed from the pressure vessel, they were again tested by being dropped onto concrete from the six foot height. All the bags survived the drop tests without damage.

While the invention has been described in terms of its use as an I.V. bag, and while certain physical requirements of an I.V. bag have been described, it is highly possible that the autoclavable structure of the invention may find uses in other areas. Thus those requirements specific to the I.V. bag, particularly dimensional stability and clarity are not critical to the invention as a whole, but only in the application of the invention to I.V. bags and the like. Thus the scope of the invention should be limited only by the appended claims.

Having thus described the invention, what is claimed is:

1. A coextruded multiple layer film, comprising:
   a first layer of a propylene ethylene copolymer;
   a second layer, adhered on one of its surfaces to said first layer, said second layer being a blend of 20% to 80% propylene ethylene copolymer and 80% and 20% linear low density polyethylene;
   and a third layer adhered to the other said surface of said second layer, said third layer comprising linear low density polyethylene;
   the layers of said multiple layer film being capable of remaining firmly bonded to each other even after exposure to autoclave processing conditions.

2. A multiple layer film as in claim 1 wherein said film is at least about 5 mils thick, and wherein said first layer comprises about 10% to 50% of the thickness of said film, said second layer comprises about 10% of the thickness of said film and said third layer comprises about 40% to 80% of the thickness of said film.

3. A multiple layer film as in claim 1 or 2 wherein said second layer comprises a blend of about 50% propylene ethylene copolymer and about 50% linear low density polyethylene.

4. A multiple layer film as in claim 1 wherein said first layer is about 30% of the film thickness, wherein said second layer is about 10% of the film thickness and comprises a blend of about 50% propylene ethylene copolymer and about 50% linear low density polyethylene, and wherein said third layer is about 60% of the film thickness.

5. A bag, said bag comprising two facing sidewalls, said sidewalls being joined to each other by heat seals about the periphery of said pouch, said pouch being capable of maintaining strong heat seals and strong interlayer adhesions after being subjected to retort processing conditions, each said sidewall of said bag comprising a first layer disposed toward the interior of said bag and including said heat seals, said first layer comprising a propylene ethylene copolymer; a second layer adhered on one of its surfaces to said first layer and being disposed outwardly of said bag from said first layer, said second layer being a blend of 20% to 80% propylene ethylene copolymer and 80% to 20% linear low density polyethylene; and a third layer adhered to the other said surface of said second layer, said third layer comprising linear low density polyethylene.

6. A bag as in claim 5 wherein each said sidewall is at least 5 mils thick, and wherein, in each said sidewall, said first layer comprises about 10% to 50% of the thickness of said sidewall, said second layer comprises about 10% of the thickness of said sidewall and said third layer comprises about 40% to 80% of the thickness of said sidewall.

7. A bag as in claim 5 or 6 wherein said second layer comprises a blend of about 50% propylene ethylene copolymer and about 50% linear low density polyethylene.

8. A bag as in claim 5 wherein, in each said sidewall, said first layer is about 30% of the sidewall thickness, said second layer is about 10% of the sidewall thickness and comprises a blend of about 50% propylene ethylene copolymer and about 50% linear low density polyethylene, and wherein said third layer is about 60% of the film thickness.

* * * * *